United States Patent Office 2,786,775
Patented Mar. 26, 1957

2,786,775

ASPHALT EMULSIONS CONTAINING SMALL AMOUNTS OF LEAD NAPHTHENATE TO IMPROVE ADHESIVITY

Elwood D. Wells, Lakewood, and Robert B. Faris, Jr., Solon, Ohio, assignors to The Standard Oil Company, Cleveland, Ohio, a corporation of Ohio No Drawing. Application March 9, 1953,
Serial No. 341,354

1 Claim. (Cl. 106—277)

The present invention relates to asphalt emulsions having improved adhesion, and more particularly to those asphalt emulsions in which the asphalt contains an adhesion-improving additive comprising lead naphthenate.

Ordinary asphalt from petroleum sources that is used for paving purposes, generally termed asphalt "cement", must be heated to a temperature generally about 300° in order to be free flowing for mixture with aggregate. In order to avoid the requirements for heating, it has been proposed to flux or dissolve the asphalt in a hydrocarbon solvent in order that the asphalt may be free flowing at room or ambient temperatures. The amount of the solvent determines the viscosity of the asphalt. These compositions are known as "cut-back" asphalts. This form of asphalt is more expensive because of the solvent requirements. The evaporation of the solvent after use also presents fire hazards and may be time consuming.

It has also been proposed to emulsify asphalt in water. Asphalt "emulsions" have been used more extensively abroad than in this country. The asphalt is more commonly emulsified as the inner phase of the emulsion which is of the so-called oil-in-water type. The particles of asphalt in the emulsion range from 1 to 20 microns in size and the asphalt emulsion is free flowing at ordinary temperatures. The water and emulsifying agent used in making emulsion is, of course, much cheaper than the hydrocarbon solvent required for making a cut-back asphalt. The viscosities of the asphalt emulsions and the cut-back asphalts are comparable.

In making asphalt emulsions, the asphalt is heated to a liquid state, and the water containing the dispersing agent, generally soap, is emulsified with the asphalt, such as in a colloid mill. The emulsion varies in color from brown to black, the lighter colors generally indicating a greater subdivision of the asphalt particles.

When the asphalt emulsion is applied to aggregate or soil, the water either evaporates or is absorbed and the emulsion breaks and the asphalt is intended to adhere to the aggregate or soil.

Asphalt emulsions must meet five important criteria, i. e., stability, demulsibility, asphalt content, viscosity, and adhesion.

The stability of the emulsion is important since it is usually prepared ahead of time and shipped in drums, tank or railroad cars and must remain unbroken in the emulsion form until used. If the emulsion breaks in the container, not only would the product be useless, but it would be difficult to remove the asphalt from the container. Practically speaking, the emulsion must remain stable during any storage time at the refinery, during shipping, and during any storage time after receipt until used. This period may vary widely from a few days to many months. Since there is no accepted specification on stability, they are referred to as satisfactory if they remain stable for a reasonable period during the test.

The demulsibility test indicates the rate at which the emulsion breaks into its components after it is applied. Asphalt emulsions are generally made in three types: The RS or rapid setting type, the MS or medium setting type, and the SS or slow setting type. The first two are the most common. The demulsibility test is described as A. S. T. M. Test No. D–244–42 and is carried out by adding calcium chloride solution to the emulsion and measuring the amount of asphalt that is recovered from the emulsion within certain times. Ohio Specification M–5.5 requires at least 60% of the asphalt to be demulsified within the time specified in the A. S. T. M. test in the RS type, and not more than 30% in the MS type. Thus the emulsion must be one which is unstable under the conditions of use but must be stable until use.

The asphalt content is generally specified as 50% or more. Ohio Specification M–5.5 requires an asphalt content of at least 55% for the rapid setting type and at least 60% for the medium setting type. This requirement is important since it is the asphalt content of the emulsion that is of value and asphalts of high water content are less desirable because the water is of no value.

The viscosity is related somewhat to asphalt content, but viscosity requirements generally are such as to permit mixing of the emulsion with the aggregate. If the water content of the emulsion is plotted against viscosity, there is a sharp decrease in viscosity of the emulsion when the water content reaches 40 to 50%, and as the amount of water increases beyond this, the viscosity of the emulsion rapidly approaches the viscosity of water. Asphalt contents above about 50 to 60% have higher viscosities. Thus an emulsion with maximum asphalt content, which has a low enough viscosity for mixing, is ideal. The viscosity is measured in Furol seconds at a stated temperature. The viscosity measurement test is described as A. S. T. M. D–244–42. Ohio Specification M–5.5 specifies a viscosity of 20 to 100 for the RS–1 type of 25° C., 75 to 400 for the RS–2 type at 50° C., and 100 to 1,000 for the MS type at 50° C.

The last requirement, namely adhesion, is particularly important and is more significant in the case of emulsions than in the case of asphalt cements. Since asphalt cements are generally applied hot to dry aggregate, it is not as difficult to secure adhesion when the asphalt is mixed with aggregate. In the case of asphalt emulsions, however, the water is in the outer phase and tends to wet the aggregate before the asphalt touches it. In fact, one of the advantages attributed to asphalt emulsion is the ability to use a wet aggregate during construction, thereby eliminating the expense of drying and preheating the aggregate.

Asphalt emulsions are notoriously poor in adhesion properties, and there is no standardized A. S. T. M. or Federal testing procedure for this propetry of emulsions. Various adhesion tests have been proposed and one test which has been devised, and which is the one used by the applicants, is Ohio Specification M–205.5. The testing procedure is as follows:

100 grams of dry standard silica aggregate graded to pass a ¼ inch sieve and to be retained on a No. 10 sieve shall be heated to 300° F. in a metal container on a hotplate, then 8 grams of the emulsion added (the emulsion need not be heated) and mixed until the aggregate is completely coated. Approximately 50 grams of the mixture shall be spread thinly on a metal can lid or a watch glass and placed in a constant temperature oven at 200° F. for 24 hours. At the end of this curing period, the 50-gram sample shall be thoroughly remixed if any drainage has occurred and dropped into 400 cc. of boiling distilled water in a 600 cc. beaker and stirred for 3 minutes at the rate of approximately 60 times per minute, continuing the boiling of the water during the 3-minute period. The beaker shall then be removed from the source of heat and after ebullition ceases, cold water shall be run into the beaker through a ¼ inch tubing submerged about one inch below the surface of the water. The addition of the cold water shall be continued until the film of asphalt on the surface of the water in the beaker has flown over the side. After this is accomplished, the sample shall be removed from the beaker, care being taken to prevent recoating of the aggregate with asphalt deposited on the beaker, and placed on absorbent paper. After drying, the sample shall be examined for uncoated areas and an estimate made of the percent of aggregate area remaining coated with asphalt.

Most commercial asphalt emulsions have a rating of 0 to 15% when tested by the above procedure. An additive that raises the adhesion of the asphalt emulsion to 50% under this test is considered to impart a marked improvement, and an adhesion of 75% is excellent.

A résumé of the requirements is as follows:

TABLE I

| Requirement | RS-1 | RS-2 | MS |
|---|---|---|---|
| Furol viscosity in seconds: | | | |
| at 25° C | 20-100 | | |
| at 50° C | | 75-400 | 100-1,000. |
| Asphalt Content or residue, percent | 55+ | 60+ | 60+. |
| Stability | Satisfactory. | Satisfactory. | Satisfactory. |
| Demulsibility: | | | |
| 35 cc. N/50 CaCl₂, percent | 60+ | 60+ | |
| 50 cc. N/10 CaCl₂, percent | | | 30−. |
| Adhesion Test, percent of aggregate coated | 50 to 75 | 50 to 75 | 50 to 75. |

Asphalt emulsions are fully described in the art. The invention is applicable to all asphalt emulsions, especially those of the oil-in-water type in which the dispersing agent is or comprises a soap. The manner of making the emulsions is well known in the art together with the ingredients, proportions, mixing techniques and conditions, and further description is not necessary.

It is not difficult to meet the specifications on asphalt content, viscosity, stability and demulsibility. It is difficult, however, to meet these requirements and at the same time to achieve good adhesion. The invention is concerned with improving the adhesion of the asphalt to aggregate and at the same time meeting the other specifications. The difficulty of achieving good adhesion will be readily understood when it is considered that the stability and demulsibility largely involve surface active considerations. The same is true of the adhesion of the asphalt, i. e., the ability of the asphalt to adhere to the aggregate is largely a surface active phenomenon. Many compounds are available to improve the adhesion of asphalt cement which cannot be used in asphalt emulsions because these compounds are generally so polar or possess such surface active properties as to interfere with the viscosity, stability or demulsibility of the emulsion. The selection of an additive which will increase the adhesion and not affect the stability or demulsibility, i. e., will still permit the emulsion to meet specifications on these scores, is a genuine problem in the art not easily solved.

In an asphalt emulsion made with a sodium soap as the emulsifier, it is believed that a fatty end of the soap molecule attaches itself to the asphalt in the emulsion and the sodium end of the soap molecule projects and is in the aqueous phase. It will be apparent that any ingredient of either the asphalt or the aqueous phases may readily affect this balance to such an extent as to affect the character of the emulsion.

Additives useful in cement and cut-back do not serve as guides in solving the problem of improving the adhesion of emulsions because most adhesive additives for asphalt cement are unsuitable in emulsions and there is no correlation or predictability from the asphalt cement art as to what additives are suitable in emulsions.

For example, U. S. Patent No. 2,243,409 to Emile L. Baldeschwieler discloses that the adhesivity of a bituminous composition may be increased by increasing the acidity of the composition. This increase in acidity is achieved by adding from 0.5 to 3.0% of a lead soap to an asphalt and thereafter maintaining the asphalt at a temperature of 210 to 350° F. for at least five days. It is not possible, however, to prepare satisfactory asphalt emulsions from the asphalt compositions of Baldeschwieler for at least two reasons as will be demonstrated hereinafter. The first reason is that the concentrations of lead naphthenate found desirable by Baldeschwieler for asphalt cement are too high to yield an asphalt emulsion of satisfactory stability and/or viscosity. The second reason is that the development of acidity is harmful when the asphalt is to be used in making an emulsion because it does not meet demulsibility requirements.

Many additives have been proposed heretofore for asphalt emulsions for variety of properties. In general, however, these additives are contained in the aqueous phase and our invention is to be distinguished from these since our additive is added to the asphalt phase.

In accordance with the invention it has been found that the incorporation into the asphalt phase of an asphalt emulsion of an amount of lead naphthenate equal to from about 0.025 to 0.21% by weight of asphalt on a lead basis improves the adhesivity of the asphalt emulsion and results in an asphalt emulsion which meets all of the requirements described hereinabove. The amount of lead naphthenate is expressed on a lead basis because the molecular weight of lead naphthenate is subject to variation due to differences in the molecular weights of naphthenic acids from which lead naphthenate is prepared. Lead naphthenate is generally supplied to the trade as a solution in a hydrocarbon and the concentration of the solution is conventionally expressed in per cent lead for the reason given above. Generally speaking, however, the percentage by weight of lead naphthenate will be approximately twice the percentage of lead.

Contrary to the teachings of the Baldeschwieler patent, it has been found that satisfactory emulsions cannot be prepared if the asphalt containing lead napthenate is heated for too long a period prior to emulsification. Ideally, the lead naphthenate should be admixed with the heated asphalt just prior to emulsification but, in accordance with this invention, the mixture of asphalt and lead naphthenate can be heated for a few hours prior to emulsification without deleterious effects. A heating period of one day in the presence of lead naphthenate is the most that can be tolerated without adversely affecting the demulsibility of the resulting emulsion.

The invention will be illustrated by the following examples in which parts are by weight unless otherwise specified.

*Example 1*

Seventy-five and eight tenths parts of asphaltic residuum having a penetration of 180–200 at 77° F. was heated to a temperature of 300° F. and blended with lead naphthenate in an amount equal to 0.12% lead based on the weight of asphalt. (This amount of lead naphthenate was equal to 0.25% by weight of lead naphthenate.) The resulting mixture was immediately emulsified using potassium tallate as an emulsifying agent. The resulting emulsion had the following properties:

| | |
|---|---|
| Furol viscosity (50° C.) | 105 |
| Asphalt content (percent) | >60 |
| Stability | Good |
| Demulsibility (percent) | 66 |
| Adhesion (percent) | 100 |
| Soap (percent of aqueous phase) | 3.04 |
| Free alkali (percent of aqueous phase) | 0.18 |

The emulsion of this example possesses all of the characteristics required of an RS-2 type of emulsion.

Example 1A

An asphalt emulsion was prepared exactly according to the procedure of Example 1 except that the mixture of asphalt and lead napthenate was heated for five days at 300° F. prior to emulsification. The resulting emulsion possessed the following characteristics:

| | |
|---|---|
| Furol viscosity (50° C.) | 210 |
| Asphalt content (percent) | >60 |
| Stability | Good |
| Demulsibility (percent) | 52.5 |
| Adhesion (percent) | 100 |
| Soap (percent of aqueous phase) | 3.04 |
| Free alkali (percent of aqueous phase) | 0.18 |

The emulsion of this example does not meet the demulsibility specifications for an RS type emulsion. The example demonstrates the deleterious effects of heating the asphalt mixture for too long a period before emulsification.

Examples 2 to 8

A series of asphalt emulsions were prepared according to the procedure of Example 1 with variations in the apshalt base and the percentage of lead naphthenate. The compositions of the emulsions and the adhesion test results are given in the following table:

TABLE II

| Example No. | Penetration of Asphalt Base (77° F.) | Soap | Lead Naphthenate (percent lead based on Weight of Asphalt) | Adhesion Test (percent coated) |
|---|---|---|---|---|
| 2 | 180-200 | K Tallate | none | 1 |
| 3 | 180-200 | ...do... | 0.04 | 60 |
| 4 | 180-200 | ...do... | 0.06 | 97 |
| 5 | 180-200 | ...do... | 0.12 | 85 |
| 6 | 180-200 | K Rosinate | 0.21 | 95 |
| 7 | ¹180-200 | K Tallate | none | 1 |
| 8 | ¹180-200 | ...do... | 0.12 | 100 |
| 9 | 85-100 | ...do... | 0.21 | 85 |

¹ A different asphalt sample.

These examples demonstrate that marked improvement in the adhesivity of asphalt emulsions is obtained by incorporation of lead naphthenate in amounts ranging from 0.04 to 0.21% lead based on the weight of asphalt. These examples also meet the other specifications. Above the upper limit of the lead naphthenate the emulsion fails to meet stability and/or viscosity requirements as will be seen from the next example.

Example 9A

Attempts were made to prepare a satisfactory asphalt emulsion according to the procedure of Example 1 but employing 0.5% lead naphthenate (0.25% on a lead basis) based on the weight of asphalt. All attempts resulted in failure, some of the emulsions exceeding viscosity specifications and others being unstable. A satisfactory emulsion could not be prepared even though the amounts of potassium tallate were varied from 2.43% by weight of aqueous phase up to 7.0% by weight as shown by the following table:

TABLE III

| Experiment No. | Soap (Percent Aqueous phase) | Free Alkali (Percent Aqueous phase) | Asphalt Content, Percent | Remarks |
|---|---|---|---|---|
| 1 | 2.43 | 0.088 | >60 | Unstable. |
| 2 | 3.10 | 0.116 | >60 | Too viscous. |
| 3 | 3.80 | 0.128 | >60 | Do. |
| 4 | 3.97 | 0.224 | >60 | Do. |
| 5 | 5.0 | 0.220 | >60 | Unstable. |
| 6 | 5.72 | 0.26 | >60 | Too viscous. |
| 7 | 5.72 | 0.384 | >60 | Do. |
| 8 | 7.0 | 0.372 | >60 | Do. |
| 9 | 6.88 | 0.60 | >60 | Do. |

This example demonstrates that there is a critical upper limit on the amount of lead naphthenate that can be added to the asphalt in order to obtain a satisfactory emulsion. This upper limit as indicated by the examples is about 0.21% on a lead basis.

From the above examples it is readily apparent that the additive of this invention markedly improves the adhesion proportions of the asphalt emulsion without detracting in any way from the other proportions while at the same time permitting the emulsion to meet all of the other important requirements set by current specifications.

Inasmuch as the additive is mixed with the asphalt before the smulsion is made, it is not possible to make exact duplicate samples except within the margin of reproducibility of making emulsions. This is to be distinguished from situations in which an emulsion can be made and an additive added to the emulsion after it is made. Any differences in the comparative data in the foregoing tables are not significant in so far as the important criteria are concerned.

It is intended to cover all changes and modifications in the examples of this invention, herein given for purpose of disclosure which do not constitute departure from the spirit and scope of the appended claim.

We claim:

An oil-in-water asphalt emulsion prepared with an emulsifying agent selected from a group consisting of potassium tallate and potassium rosinate having satisfactory asphalt content, viscosity, stability and demulsibility and having as an additive in the asphalt phase of the emulsion an amount of lead naphthenate equal to from 0.025 to 0.21% lead based on the weight of asphalt, said additive improving the adhesion of the asphalt emulsion without appreciably detracting from its other properties.

References Cited in the file of this patent

UNITED STATES PATENTS

| | | |
|---|---|---|
| 2,189,379 | Kon et al. | Feb. 6, 1940 |
| 2,243,409 | Baldeschwieler | May 27, 1941 |
| 2,283,937 | Mack | May 26, 1942 |
| 2,317,959 | Johnson et al. | Apr. 27, 1943 |
| 2,332,260 | Roediger | Oct. 19, 1943 |
| 2,574,930 | Mitchel et al. | Nov. 13, 1951 |